US006850746B1

(12) United States Patent
Lloyd et al.

(10) Patent No.: US 6,850,746 B1
(45) Date of Patent: Feb. 1, 2005

(54) MIXER CIRCUIT WITH ON-CHIP TRANSFORMER

(75) Inventors: Stephen L. Lloyd, Irvine, CA (US); Keith J. Rampmeier, Costa Mesa, CA (US)

(73) Assignee: Skyworks Solutions Inc., Irvine, CA (US)

( * ) Notice: Subject to any disclaimer, the term of this patent is extended or adjusted under 35 U.S.C. 154(b) by 0 days.

(21) Appl. No.: 09/371,311

(22) Filed: Aug. 10, 1999

Related U.S. Application Data

(63) Continuation-in-part of application No. 09/201,643, filed on Nov. 30, 1998, now Pat. No. 6,275,687.

(51) Int. Cl.[7] .................................................. H04B 1/18

(52) U.S. Cl. ...................................... 455/272; 455/326

(58) Field of Search ................................. 455/292, 323, 455/313, 325, 326, 333, 343, 189.1

(56) References Cited

U.S. PATENT DOCUMENTS

| 5,323,123 A | | 6/1994 | Philippe | |
|---|---|---|---|---|
| 6,157,822 A | * | 12/2000 | Bastani et al. ............... | 455/292 |
| 6,184,739 B1 | * | 2/2001 | Doyle ......................... | 327/357 |
| 6,275,687 B1 | * | 8/2001 | Lloyd ......................... | 330/296 |
| 6,308,048 B1 | * | 10/2001 | Gore et al. .................. | 455/141 |
| 6,329,865 B1 | * | 12/2001 | Hageraats et al. .......... | 327/357 |

FOREIGN PATENT DOCUMENTS

| DE | 27 34 945 | 2/1979 |
|---|---|---|
| EP | 0 742 640 A1 | 4/1996 |

OTHER PUBLICATIONS

Article entitled "Digital Cellular Telecommunications System (Phase 2+); Radio Transmission and Reception (GSM 05.05)" by ETSI European Telecommunications Standards Institute, Version 5.2.0, Jul. 1996.

Curran, "RFICs: Dual-Band Cell Phones Emerge", *EDN*, May 22, 1997.

Menezes, "Study: Dual Mode Will Explode", *Wireless Week*, Jun. 30, 1997.

Article entitled "Track to Multi-band GSM", GSM Global System for Mobile Communications, undated.

Data Sheet entitled "RF122 Power Amplifier Controller For Heterojunction Bipolar Transistor Power Amplifiers", Rockwell Semiconductor Systems, Order No. W222, Oct. 13, 1997.

Data Sheet entitled "RF123 Translation Loop", Rockwell Semiconductor Systems, Order No. W223, Sep. 12, 1996.

Data Sheet entitled "RF130 Power Amplifier for GSM Applications", Rockwell Semiconductor Systems, Order No. W229, Dec. 3, 1997.

Data Sheet entitled "RF133 RF/IF Transceiver for GSM Applications", Rockwell Semiconductor Systems, Order No. W261, Oct. 31, 1997.

(List continued on next page.)

*Primary Examiner*—Nay Maung
*Assistant Examiner*—Tu Nguyen
(74) *Attorney, Agent, or Firm*—Knobbe Martens Olson & Bear

(57) ABSTRACT

An apparatus for modifying a radio frequency signal includes a mixer core, an input circuit and an interface circuit. The mixer core receives a first signal having a first frequency and a second signal having a second frequency, and outputs a third signal which is a function of the first and second signals. The input circuit sets a predetermined bias current, receives a radio frequency (RF) signal and inputs the RF signal into the mixer core. The interface circuit is interposed between the mixer core and the input circuit. The interface circuit receives the bias current and input it to the mixer core. In one embodiment, the input circuit includes a transistor and the interface circuit includes a transformer.

54 Claims, 11 Drawing Sheets

OTHER PUBLICATIONS

Data Sheet entitled "RF230 GSM1800/PCT1900 Power Amplifier", Rockwell Semiconductor Systems, Order No. W225, Jan. 14, 1998.

Razavi, "RF Microelectronics", Prentice Hall Communications Engineering and Emerging Technologies Series, pp. 180–205, 1998.

Krauss et al., "Solid State Radio Engineering; 7: Mixers", pp. 188–218, 1980.

Gray, et al., "Analysis and Design of Analog Integrated Circuits", Third Edition, pp. 667–681, 1993.

* cited by examiner

US 6,850,746 B1

MIXER CIRCUIT WITH ON-CHIP TRANSFORMER

This application is a continuation in part of U.S. patent application Ser. No. 09/201,643, filed on Nov. 30, 1998, now U.S. Pat. No. 6,275,687.

BACKGROUND OF THE INVENTION

1. Field of the Invention

The invention relates to a mixer circuit. More particularly, the invention relates to a mixer for a radio frequency receiver of a cellular phone.

2. Description of the Related Art

A central component of a receiver for a radio frequency signal (RF signal) is a mixer which translates a signal at a first frequency to a different, second frequency. For instance, the receiver receives the RF signal having a high radio frequency, and the mixer translates the RF signal, by mixing it with a local oscillator (LO) signal, to a signal (IF signal) having an intermediate frequency (IF). The intermediate frequency is generally lower than the radio frequency. The frequencies within the receiver are related by, $f_{IF}=f_{RF}-f_{LO}$ or $f_{IF}=f_{LO}-f_{RF}$.

The mixer, which is a nonlinear device, in fact generates an output signal that includes more frequencies than the frequencies ($f_{RF}-f_{LO}$) of the RF signal and the local oscillator signal. The output signal is usually filtered to block undesired frequencies which include the original frequencies, their harmonics and their sum and difference frequencies.

The mixer used in such a receiver should ideally exhibit several desired parameters and characteristics which describe the performance of the mixer. For example, a mixer should exhibit a high power gain, a low noise figure and the capability of handling large input signals without intermodulation distortion (IMD). The power gain is defined as the ratio of the signal power at the output port to the signal power at the input port. The noise figure is defined as the ratio of the signal-to-noise ratio (SNR) at the input port to the signal-to-noise ratio at the output port.

The intermodulation distortion refers to undesired frequency components which are caused when a signal having two or more sinusoidal frequencies $f_1$, $f_2$ is applied to a nonlinear RF circuit. The output signal of such a circuit contains the additional, undesired frequency components which are called intermodulation products. The output signal of the circuit will contain, for example, frequency components at DC, $f_1$, $f_2$, $2f_1$, $2f_2$, $3f_1$, $3f_2$, $f_1+/-f_2$, $2f_1+/-f_2$ and $2f_2+/-f_1$. The frequencies $2f_1$ and $2f_2$ are the second harmonics, the frequencies $3f_1$ and $3f_2$ are the third harmonics, the frequencies $f_1+/-f_2$ are the second-order intermodulation products, and the frequencies $2f_1+/-f_2$ and $2f_2+/-f_1$ are the third-order intermodulation products. The third-order intermodulation products are close to the fundamental frequencies $f_1$ and $f_2$ and fall within a bandwidth in which the circuit amplifies, producing distortion in the output signal. A mixer exhibits the same nonlinear performance in addition to the frequency translation.

A parameter to evaluate the third-order intermodulation products is the third-order intercept point (IP3). This point is defined by means of a graphical analysis using the output power of the third-order intermodulation product as a function of the input power and the output power of the fundamental component at f1 as a function of the input power. The intercept point is defined as the point at which the two (linearized) graphs intercept. The higher the intercept point, the better the suppression of the third-order intermodulation product and the less disturbed is the output signal of the amplifier. The mixer should exhibit, among others, a high conversion gain, a low noise figure and also a high third-order intercept point (IP3). The conversion gain is defined as the ratio of the output power of the IF signal to the input power of the RF signal.

The mixer is configurable to operate in receivers which are adapted for various applications. For example, the mixer can be used in TV receivers or in phones for a radio communications system. One example of a radio communications systems is a cellular system that is in accordance with a particular standard, such as "Global System for Mobile Communications" (GSM), "Advanced Mobile Phone System" (AMPS) or "Code Division Multiple Access" (CDMA).

These standards have different requirements and specifications for the mixer with respect to linearity, noise figure and intermodulation distortions. Particularly the CDMA standard requires that the mixers in CDMA phones have simultaneously both a high IP3 and a low noise figure.

SUMMARY OF THE INVENTION

There is therefore a need to improve mixers used in RF receivers so that a high IP3 and a low noise figure are achieved.

An aspect of the invention involves an apparatus for generating an intermediate signal. The apparatus includes a mixer core, an input circuit and a transformer. The mixer core receives a first signal having a first frequency and a second signal having a second frequency, and outputs a third signal which is a function of the first and second signals. The input circuit sets a predetermined bias current and receives a radio frequency (RF) signal. The transformer has a first winding and a second winding, and is interposed between the mixer core and the input circuit. The transformer conveys the bias current between the input circuit and the mixer core and converts the RF signal into the first signal.

A further aspect of the invention involves an apparatus for generating an intermediate signal. The apparatus includes a mixer core, an input transistor and a transformer. The mixer core receives a first signal having a first frequency and a second signal having a second frequency, and outputs a third signal which is a function of the first and second signals. The input transistor sets a predetermined bias current and receives a radio frequency (RF) signal. The transformer has a first winding and a second winding and is interposed between the mixer core and the input transistor. The transformer conveys the bias current between the input transistor and the mixer core and converts the RF signal into the first signal.

Another aspect of the invention involves a hand-held communications device. The communications device includes a mixer core, an input circuit and an interface circuit. The mixer core receives a first signal having a first frequency and a second signal having a second frequency, and outputs a third signal which is a function of the first and second signals. The input circuit sets a predetermined bias current and receives a radio frequency (RF) signal. The interface circuit is interposed between the mixer core and the input circuit and configured to receive the bias current and to input the bias current to the mixer core. In one embodiment, the input circuit includes a transistor and the interface circuit includes a transformer.

Another aspect of the invention involves an apparatus for generating an intermediate signal. The apparatus includes a mixer core, a circuit and an interface circuit. The mixer core receives a first signal having a first frequency and a second signal having a second frequency. Further, the mixer core outputs a third signal which is a function of the first and second signals. The circuit defines a predetermined electrical signal which sets the mixer core at a predetermined operational point, and receives an input signal. The interface circuit is interposed between the mixer core and the circuit and configured to receive the electrical signal and to input it to the mixer core.

A further aspect of the invention involves a method of generating an intermediate signal. A direct current (DC) bias signal (an electrical signal) is generated to set a predetermined operational point of a mixer core. A radio frequency (RF) signal (a first signal) having a first frequency is received and converted into a first alternating current (AC) signal. The first AC signal and the DC bias signal are superimposed. The first AC signal is transformed into a second AC signal and the DC bias signal is separated from the first AC signal. The second AC signal and the DC bias signal are then superimposed. A local oscillator signal having a second frequency is received and mixed with the second AC signal to generate an intermediate signal which is a function of the RF signal.

A further aspect of the invention relates to a method of operating a communications device. A predetermined bias current is generated and conveyed between an input circuit and a mixer core. The communications device receives a radio frequency (RF) signal (first signal) having a first frequency. The mixer core mixes the RF signal with a local oscillator signal (second signal) having a second frequency. The mixer core outputs an intermediate signal (a third signal) which is a function of the RF signal.

For purposes of summarizing the invention, certain aspects, advantages and novel features of the invention have been described herein. Of course, it is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

These and other aspects, advantages, and novel features of the invention will become apparent upon reading the following detailed description and upon reference to the accompanying drawings.

DETAILED DESCRIPTION OF THE PREFERRED EMBODIMENT

An embodiment of the present circuitry which comprises an amplifier circuit and a mixer is described with reference, but not limited to a radio communications system. It is contemplated that the invention is applicable in any system which requires amplification and mixing of radio frequency signals in accordance with strict requirements, for example, regarding power gain, noise figure and third-order intermodulation intercept point (IP3) which are hereinafter used as exemplary parameters for evaluating the performance of the circuitry. In one embodiment, the circuitry is part of an RF receiver for a cellular phone. The following description of an embodiment of the combination and its application is therefore referenced to the particulars of a cellular phone system (for example, GSM, CDMA, AMPS) and cellular phones.

Figure 1A:
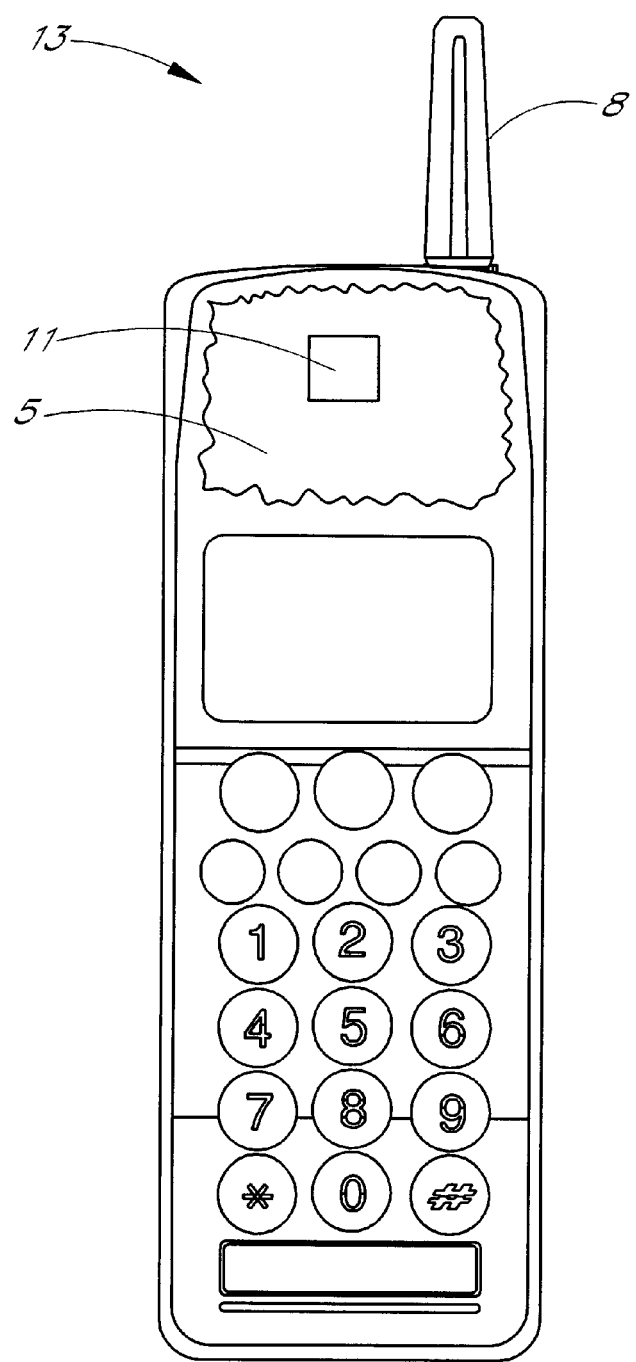
FIG. 1A is a schematic illustration of a cellular phone.

FIG. 1A schematically illustrates a cellular phone 13 including an antenna 8, a display and a keypad. A portion of the case of the cellular phone 13 is cut away to show a motherboard 5 of the cellular phone 13 with an integrated circuit 11 which includes a portion of an RF receiver as described below. Although not shown in FIG. 1A, those skilled in the art will appreciate that the cellular phone 13 comprises a plurality of other components and functional modules.

Figure 1B:
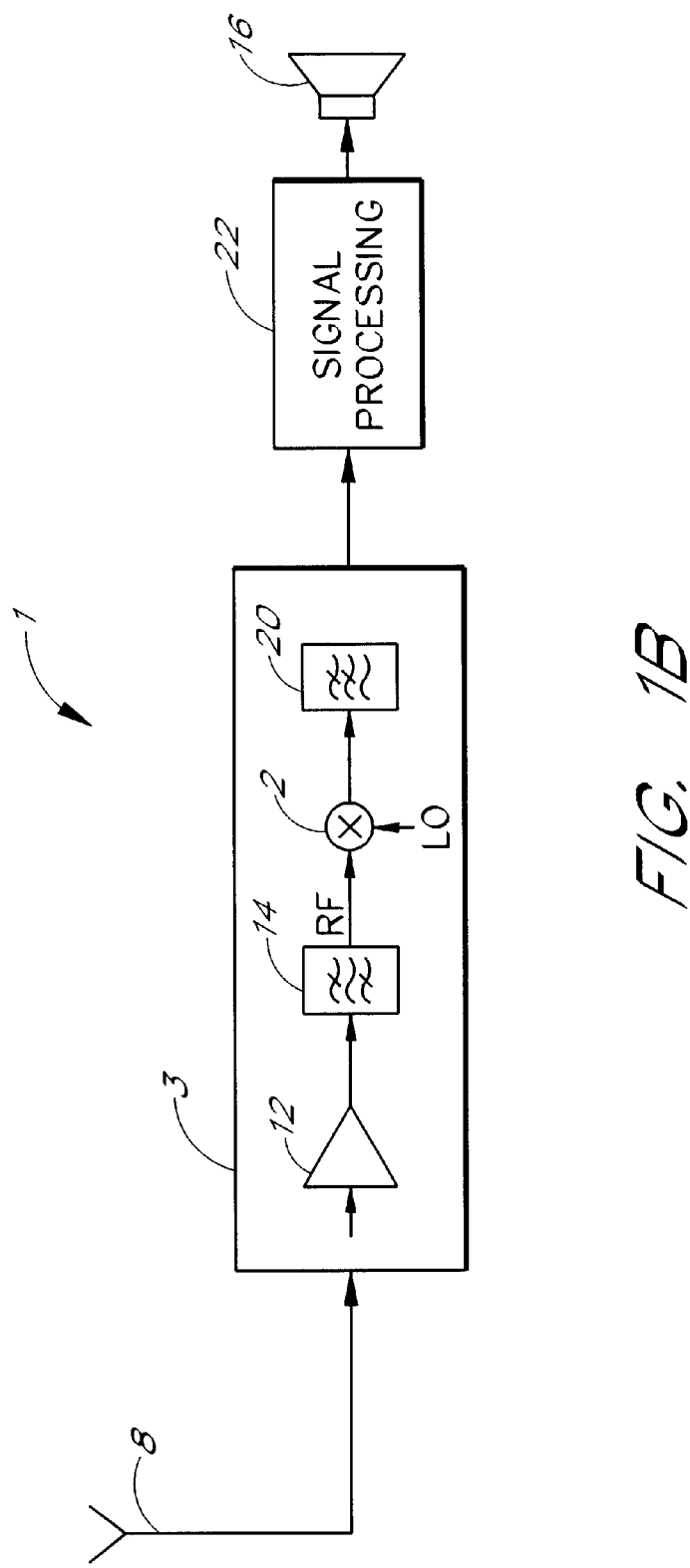
FIG. 1B is a schematic illustration of a typical receiver, for example, for use in a cellular phone.

A typical RF receiver requires several groups of amplifiers separated by frequency-changing circuits (e.g., mixers) to extract information carried by a weak signal voltage that appears at terminals of an antenna. FIG. 1B shows an illustration of a portion of a typical RF receiver 1 which is, for example, included in an RF portion of the cellular phone 13 shown in FIG. 1A. In the shown conceptional embodiment, the RF receiver 1 comprises the antenna 8 and an amplifier and mixer module 3 which is connected to the antenna 8 and to a signal processing module 22. The signal processing module 22 is connected to a loudspeaker 16. The module 3 comprises an LNA amplifier 12, a mixer 2 and filters 14, 20. The filter 14 is a band pass filter and interposed between the LNA amplifier 12 and an input for an RF signal of the mixer 2. The mixer 2 has a further input for a signal LO which is generated by a local oscillator (not shown) in a conventional manner. An output of the mixer 2 is connected to the filter 20 which is a low pass filter. In another embodiment, the filter 20 can be a bandpass filter. Hereinafter, the filter 20 is a low pass filter.

The module 3 receives an RF signal from the antenna 8 and amplifies it with the LNA amplifier 12. The amplified RF signal is filtered by the band pass filter 14 to select a specific frequency band and to limit the bandwidth of the RF signal. The mixer 2 receives the signal LO and the RF signal and generates an output signal comprising the fundamental frequencies of the RF signal and the signal LO, harmonics thereof, and intermodulation products. The low pass filter 20 selects a desired intermediate frequency (IF) and blocks undesired frequencies. The generated signal having the intermediate frequency is input to the signal processing module 22 which performs, for example, demultiplexing and decoding. After this processing, the loudspeaker 16 reproduces information conveyed by the RF signal.

In an exemplary cellular phone system, the RF signal has a carrier frequency of about 800 MHz or about 900 MHz depending on national particularities. The RF signal originates from a remote radio transmitter (base station transmitter) which modulates, for example, a 900 MHz signal with a data and/or voice signal. The signal LO generated by the local oscillator is a sinusoidal signal having a frequency between 930 MHz and 1200 MHz or between 500 MHz and 750 MHz. In one embodiment, the signal LO has a frequency of about 1 GHz. The mixer 2 outputs a signal which has the desired intermediate frequency in the range of about 50 MHz to 300 MHz (difference between the frequency of the signal LO and the carrier frequency of the RF signal). Other cellular phone systems operate, for example, at carrier frequencies of about 1800 MHz or 1900 MHz. The frequency of the signal LO in these cellular phone systems is then selected to generate a similar range for the intermediate frequency. The embodiment of the present invention is hereinafter described with reference to a 900 MHz cellular phone system. However, it is contemplated that the present invention is also applicable in cellular phone systems operating at other carrier frequencies such as 800 MHz, 1800 MHz or 1900 MHz.

Figure 1C:
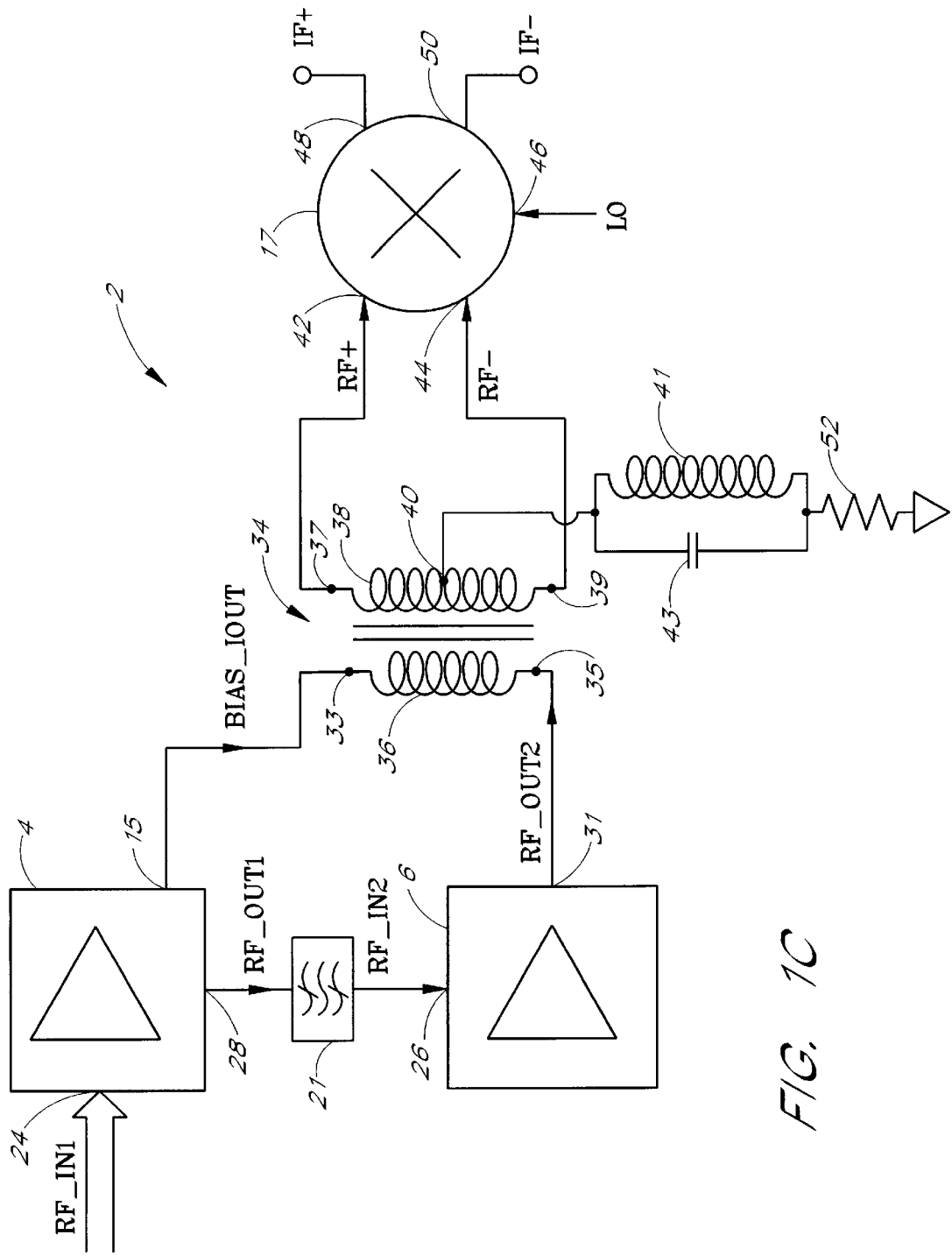
FIG. 1C is a schematic illustration of an amplifier and mixer of the receiver shown in FIG. 1B.

FIG. 1C is a schematic illustration of a portion of the RF receiver 1 shown in FIG. 1B. The portion includes a mixer core 17, an LNA amplifier 4, and a drive amplifier 6, and an interface circuit, which is in a preferred embodiment a transformer 34. In one embodiment, the drive amplifier 6, the transformer 34 and the mixer core 17 for the mixer 2 shown in FIG. 1B. The LNA amplifier 4 corresponds to the LNA amplifier 12 shown in the conceptional embodiment of FIG. 1B. It is contemplated that the shown grouping into functional blocks serves to ease the illustration of the portion of the RF receiver 1 and not is not intended to limit the description to the illustrated embodiment. Those skilled in the art will appreciate that such a grouping is random and that other groupings or no grouping at all are possible. For example, components of the LNA amplifier 4 can be assigned to the drive amplifier 6 and vice versa, without changing the principal operation of the circuitry.

In one embodiment, the circuitry shown in FIG. 1C is designed to be manufactured and implemented with processes based on silicon technology which are less expensive than processes in GaAs technology. It is contemplated that the circuitry, all or only a part of the circuitry, is preferably implemented as an integrated circuit (IC) on a silicon wafer comprising a plurality of chips. Each chip comprising the integrated circuit is then mounted to a support. The support has a plurality of planar lines which are connected to pins. Each chip has contact pads which are connected to the lines by means of bond wires. The mounted and bonded chip is then sealed with a plastic composition, as it is known in the art, to form a package, for example, a dual-inline package (DIP). Alternatively, the pads of the chip can be arranged in such a way so that the pads can be soldered to the lines to avoid bond wires. To implement any necessary inductors, internal or external inductors can be used. Depending on how much of the circuitry is integrated on a chip, more or less external components need to be connected to the package, to fulfill the specific parameters.

The circuitry is designed and implemented under consideration of rules known in the field of design of high frequency/radio frequency circuits. Those skilled in the art will appreciate that the circuitry can be realized with discrete components or as a hybrid module under consideration of these rules, although an integrated circuit is the preferred implementation. The use of a standard silicon bipolar process allows that the circuitry can be integrated with a high level of integration. Advantageously, the circuitry has a low power consumption.

In the illustrated embodiment, the LNA amplifier 4 has an input 24 for an RF signal RF_IN1 which originates from the antenna 8 shown in FIG. 1B. The LNA amplifier 4 further has an output 28 for an RF signal RF_OUT1 and an output 15 for a signal BIAS_IOUT. The output 28 is connected to a filter 21 having a filter characteristic selected to block undesired frequency components. In one embodiment, the filter 21 is a conventional band pass filter of a desired order having, for example, an upper cut-off frequency of about 895 MHz and a lower cut-off frequency of about 860 MHz. The upper and lower cut-off frequencies define a receive band for the RF receiver 1.

Figure 3:
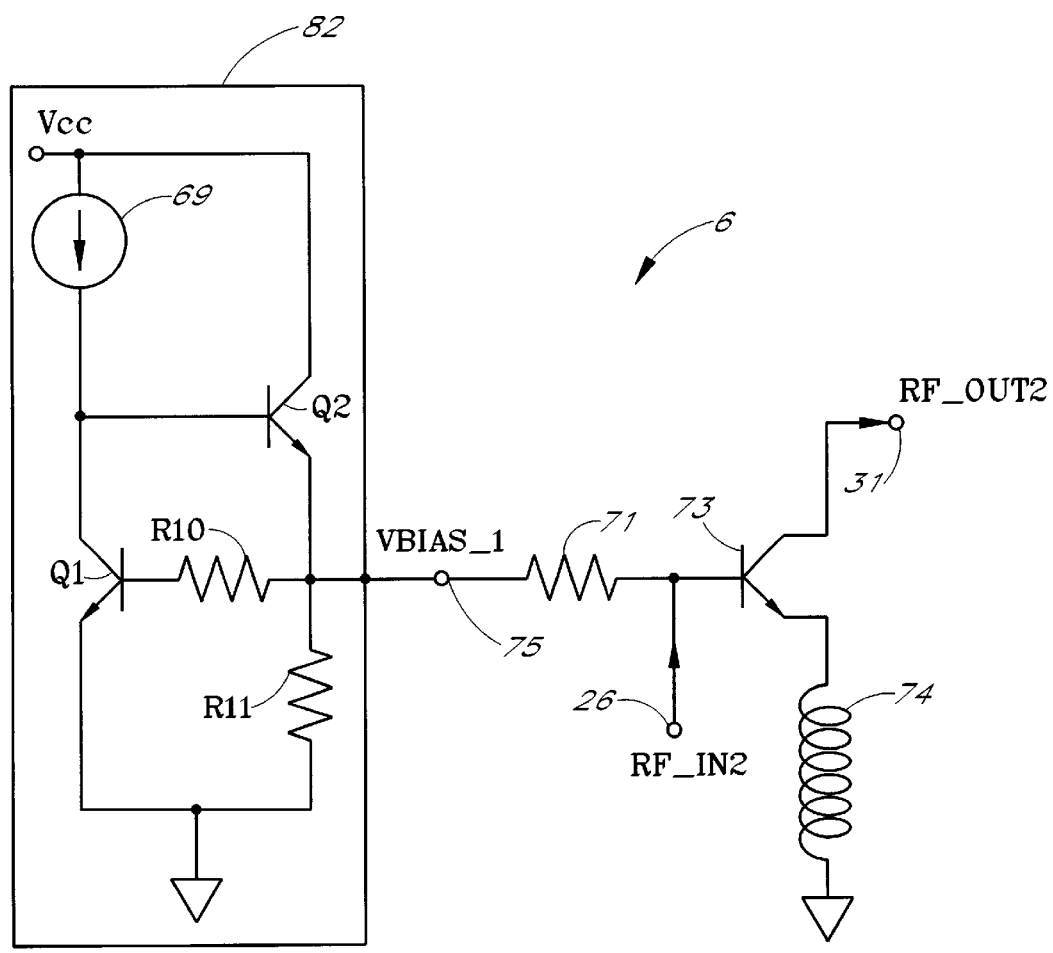
FIG. 3 is a schematic illustration of an input stage of the mixer.
Figure 4:
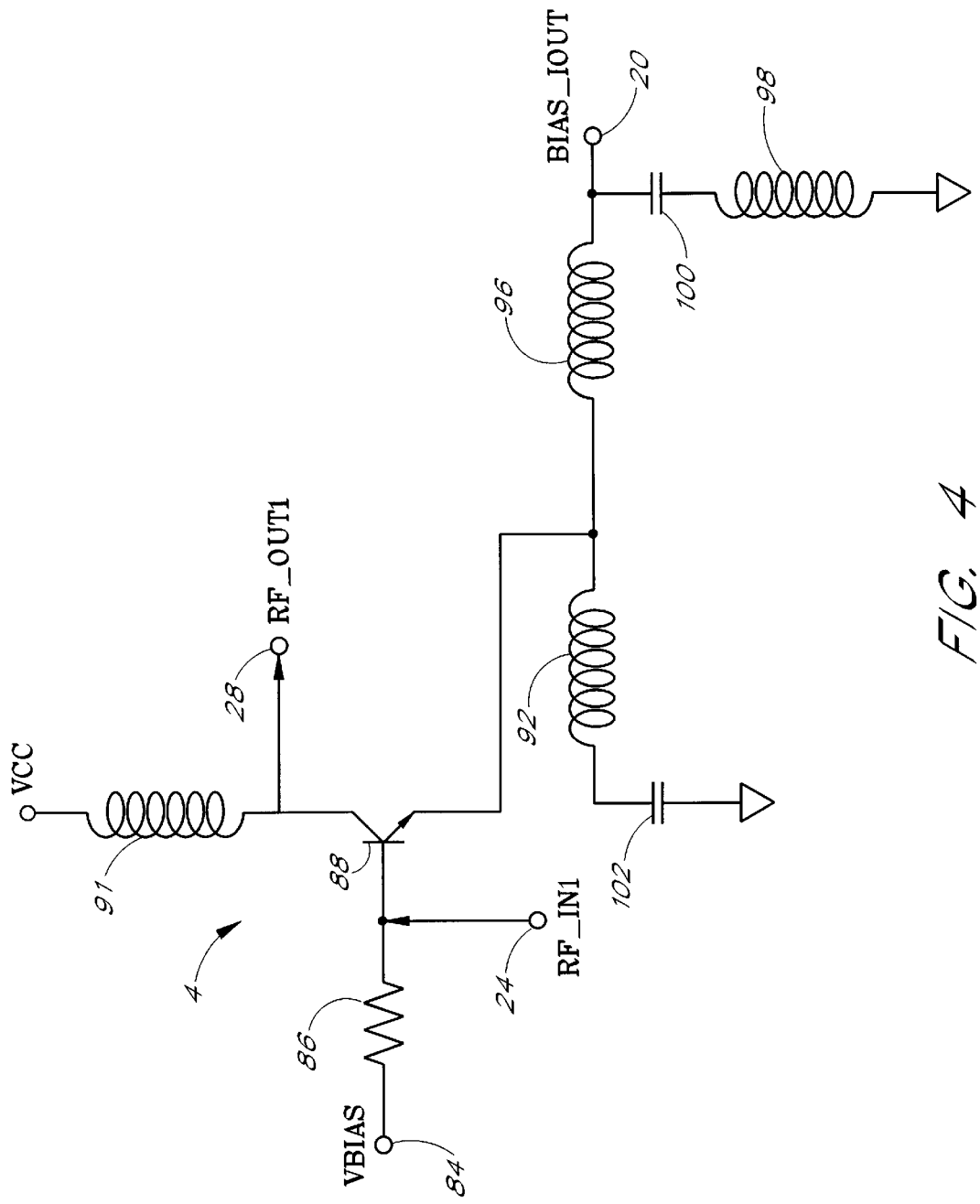
FIG. 4 is a schematic illustration of a low noise amplifier.

The filter 21 receives the RF signal RF_OUT1 and outputs an RF signal RF_IN2. The drive amplifier 6 has an input 26, connected to the filter 21, for the RF signal RF_IN2 and an output 31 for an RF signal RF_OUT2. Both, the LNA amplifier 4 and the drive amplifier 6 are connected to a power supply (not shown) and circuitry which, among others, allows biasing the amplifiers 4, 6 to set a desired operational mode. An embodiment of the drive amplifier 6 is shown in FIG. 3 and an embodiment of the LNA amplifier is shown in FIG. 4.

The signal RF_IN1 has, for example, a carrier frequency of about 900 MHz. The LNA amplifier 4 is configured to amplify RF signals in this 900 MHz frequency range, i.e., the signal RF_OUT1 is the amplified signal RF_IN1 and has the same carrier frequency of about 900 MHz. The filter 21 blocks frequencies of the signal RF_OUT1 which are outside the pass band between the upper and lower cut-off frequencies so that the signal RF_IN2 (900 MHz) corresponds to the signal RF_OUT1, but is limited in bandwidth.

The transformer 34 has a first winding 36 with terminals 33, 35 and a second winding 38 with terminals 37, 39, 40. The terminal 33 is connected to the output 15 of the LNA amplifier 4 and the terminal 35 is connected to the output 31 of the drive amplifier 6. The terminal 37 is connected to an input 42 of the mixer core 17 and the terminal 39 is connected to an input 44 of the mixer core 17. The second winding 38 of the transformer 34 has the terminal 40 which is a (center) tap grounded via a resonant circuit and a resistor 52. The resonant circuit includes a parallel arrangement of an inductor 41 and a capacitor 43. The resonant circuit is connected to the terminal 40 and the resistor 52 which is grounded. The terminal 40 is a reference to ground for the signal portions RF+ and RF−.

In one embodiment, the transformer 34 is integrated on the chip together with other components of the circuitry. The primary and secondary windings 36, 38 are realized in metal layers (e.g., three metal layers) of the chip as it is known in the art. The transformer 34 is implemented to have a high coupling efficiency, preferable higher than 0.8 between the primary and secondary windings 36, 38. The primary and secondary windings 36, 38 both have preferably more than one turn. In the illustrated embodiment, the transformer 34 is a balanced transformer having, for example, a transformation ratio of 1:1. It is contemplated that the transformer 34 can have other transformation ratios.

As indicated in FIG. 1C, the signal BIAS_IOUT flows from the LNA amplifier 4 through the winding 36 into the drive amplifier 6. The signal BIAS-IOUT is a DC bias current. In one embodiment, the DC bias current is 10 milliamperes (mA) which is determined by the drive amplifier 6. The signal BIAS_IOUT flows through the LNA amplifier 4 and through the drive amplifier 6. The illustrated architecture, which allows such "re-using" of the DC bias current provides for fulfilling the circuit requirements of having simultaneously both a high IP3, a low noise figure, and a low power consumption.

The drive amplifier 6 is a single-ended gain stage coupled to the mixer core 17 via the transformer 34 which allows the achievement of a lower noise figure. The transformer converts the single-ended RF signal into a differential signal which helps to suppress even-order signal distortions.

The LNA amplifier 4, the drive amplifier 6 and the transformer 34 can be implemented as an individual IC component. The IC component is then connectable to mixer cores selected for specific applications providing application and design flexibility.

In one embodiment, the mixer core 17 is a differential mixer core and receives a differential RF signal having a "positive" signal portion RF+ and a "negative" signal portion RF− from the transformer 34. The mixer core input 42 receives the positive signal portion RF+ and the mixer core input 44 receives the negative signal portion RF−. A signal LO generated by a local oscillator is received at an input 46 of the mixer core 17. The mixer core 17 has two outputs 48, 50 for a differential intermediate frequency signal having a "positive" signal portion IF+ and a "negative" signal portion IF−. An embodiment of the mixer core 17 is shown in greater detail in FIG. 2.

Figure 2:
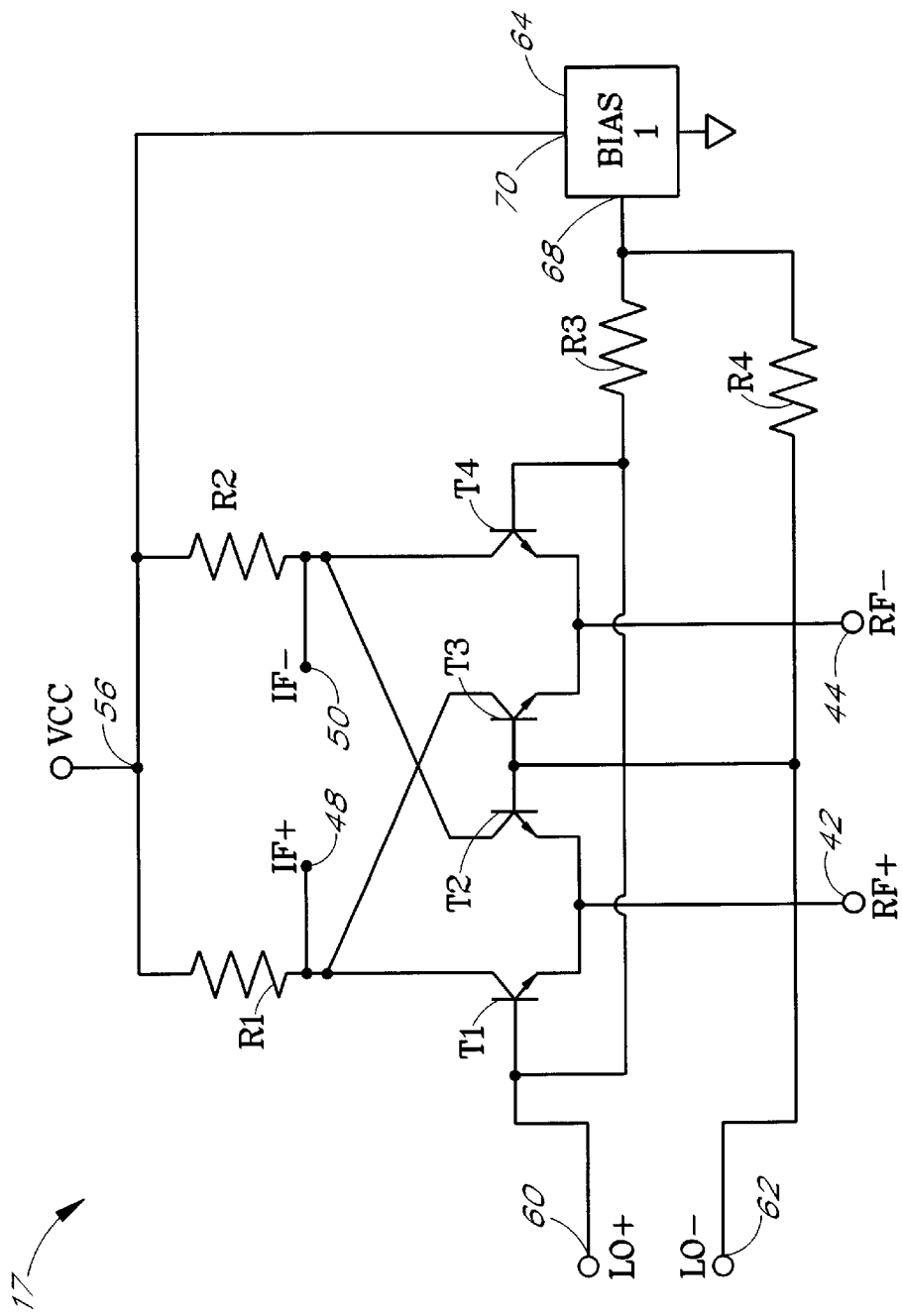
FIG. 2 is a schematic illustration of a first embodiment of a mixer core.

FIG. 2 is a schematic illustration of a first embodiment of the mixer core 17. The mixer core 17 comprises a bias circuit 64 and four transistors T1, T2, T3, T4 each having a base, an emitter and a collector. The transistors T1–T4 form the center of the mixer core 17 which is known as a Gilbert cell and described, for example, in Paul Grey and Robert Meyer, "Analysis and Design of Analog Integrated Circuits", John Wiley & Son, pages 593–605, ISBN 0-471-87493-0.

The emitters of the transistors T1, T2 are interconnected and both connected to the input 42 for the signal portion RF+. The emitters of the transistors T3, T4 are interconnected and both connected to the input 44 for the signal portion RF−. The collectors of the transistors T1, T3 are interconnected and both connected to a resistor R1, which is also connected to a port 56 for a power supply VCC, and to the output 48 for the signal IF+. The collectors of the transistors T2, T4 are interconnected and both connected to a resistor R2, which is also connected to the port 56, and to the output 50 for the signal IF−. The bases of the transistors T1, T4 are interconnected; both bases are connected to a port 60 and to a resistor R3 which is also connected to a port 68 of the bias circuit 64. The port 60 receives a "positive" signal LO+ derived from the local oscillator. The bases of the transistors T2, T3 are interconnected; both bases are connected to a port 62 and to a resistor R4 which is also connected to the port 68 of the bias circuit 64. The port 62 receives a "negative" signal LO− derived from the local oscillator. The bias circuit 64 has a port 70 which is connected to the power supply port 56.

The transistors T1–T4, as well as other transistors described hereinafter, are advantageously npn bipolar junction transistors (BJT) implemented in silicon technology. The transistors T1–T4 are configured to mix signals having frequencies in the range between 900 MHz and 1200 MHz. It is contemplated that other types of transistors, such as npn or pnp heterojunction bipolar transistors (HBT) or field effect transistors (FET) can be used in the embodiments of the circuitry.

In the illustrated embodiment of the mixer core 17, the resistors R1, R2 have approximately 500 ohms each, and the resistors R3, R4 have approximately 1 kiloohm each. The power supply is typically a voltage source that provides a voltage of about 5 volts. It is contemplated that the voltage may vary depending on the particulars of the technology used to implement the mixer core 17.

The mixer core 17 is a double-balanced mixer core which has both the signals RF+, RF− and the signals LO+, LO− applied to separate inputs 42, 44 and ports 60, 62 in push-pull fashion. The mixer core 17 is therefore configured so that the signals LO+, LO− do not appear at the inputs 42, 44 and the outputs 48, 50. The signals LO+, LO− control the on-off cycles of the transistors T1–T4. For instance, when the transistor T1 is on, the input 42 is connected to the output 48, and when the transistor T3 is on, the input 44 is connected to the output 48. Similar on-off cycles exist for the transistors T2, T4.

Each transistor T1–T4 mixes a signal RF+, RF− having a frequency $f_1$ with a signal LO+, LO− having a frequency $f_2$ generating an output signal IF.

The signal LO (applied between LO+ and LO−) causes the transistors T1–T4 to act as switches, effectively multiplying a unit square wave at the LO frequency by the input signal.

The signal LO can be written as a Fourier series:

$$V_{LO} = \frac{4}{\pi}[\sin(\omega_{LO}t) + \frac{1}{3}\sin(3\omega_{LO}t) + \ldots].$$

The input can be written:

$$V_i(t) = V_a \sin(\omega_i t).$$

Multiplying $V_{LO}$ and $V_i$ and a scale factor representing the mixer core's gain, the output signal is:

$$V_{if}(t) = A * V_a * \frac{4}{\pi}[\sin(\omega_{LO}t)\sin(\omega_i t) - \frac{1}{3}\sin(3\omega_{LO}t)\sin(\omega_i t) + \ldots].$$

The first term gives the desired output:

$$\sin(\omega_{LO}t)\sin(\omega_i t) = \frac{1}{2}[\cos[(\omega_{LO}-\omega_i)t] - \cos[(\omega_{LO}+\omega_i)t]].$$

Filtering removes the unwanted signals (frequencies) resulting in the desired (frequency translated) output, wherein $A*2/\pi$ is the total gain of the mixer core 17:

$$V_{IF}(t) = AV_a \frac{2}{\pi} \cos[(\omega_L - \omega_i)t].$$

When the mixer core 17 is used in an RF receiver, only the absolute value of the difference frequency $f_1-f_2$ is required. That is, the original frequencies $f_1$, $f_2$, their harmonics $2f_1$, $2f_2$, $3f_1$, $3f_2$, and their sums, for example, $f_1+f_2$, are removed by filtering or other means. Further details regarding mixing are described in a book by Herbert L. Krauss, et al., "Solid State Radio Engineering", chapter 7, 1980, John Wiley & Son, ISBN 0-471-03018.

The mixer core 17, in combination with the drive amplifier 6, has a conversion gain of about 15 dB which is sufficiently high to fulfill the requirements discussed above. Advantageously, the mixer core 17 suppresses the signal LO from interfering with the signal IF, and suppresses the signal RF from interfering with the signal IF. The mixer core 17 can be implemented in a flexible manner as a differential output mixer core 17 or as a single-ended output mixer core 17' as shown in FIG. 5.

Figure 5:
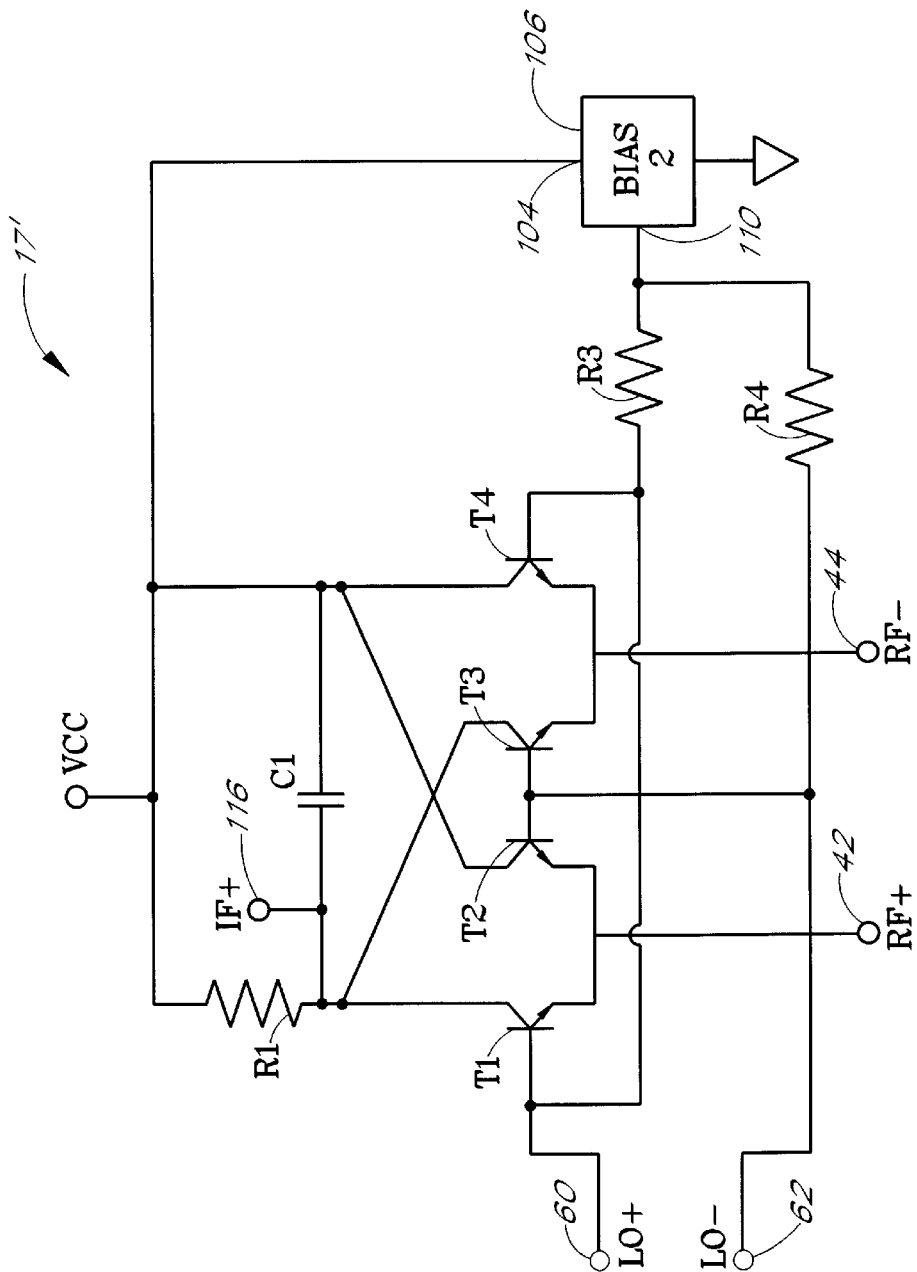
FIG. 5 is a schematic illustration of a second embodiment of the mixer core.

The resonant circuit formed by the inductor 41 and the capacitor 43 is connected to the terminal 40 of the transformer 34 to improve the noise figure of the mixer core 17 in the case of a single-ended output of the mixer core 17' (FIG. 5). The inductor 41 allows the DC current to flow through it without disturbing the DC biasing. The resonant circuit resonates at a frequency:

$$f_{res} = \frac{1}{2\pi\sqrt{LC}}$$

providing a high impedance at and near the resonant frequency for current flowing out of the terminal 40 of the transformer 34. This high impedance lowers the gain at the IF frequency of a parasitic gain path that allows inherent thermal noise from the biasing circuits to reach the output 116 (FIG. 5). Reducing the amount of thermal noise that reaches the output reduces the noise figure of the circuit.

The bias circuit 64 outputs a DC bias voltage at the port 68 which is connected to the resistors R3, R4. The resistors R3, R4 isolate the bias circuit 64 from the signal LO applied at ports 60, 62. The DC bias (collector) current through the transistors T1–T4 is set by the DC bias current from the drive amplifier through the transformer and splits equally between the transistors T1–T4. In one embodiment, the total current is about 10 mA and the resistors R3, R4 have a value of about 1 kiloohm each.

FIG. 3 is a schematic illustration of the drive amplifier 6 shown in FIG. 1C. The drive amplifier 6 forms an input stage of the mixer 2 and comprises a transistor 73 having a base, an emitter and a collector. The base of the transistor 73 is connected to the port 26, which receives the signal RF_IN2, and to a resistor 71, which receives a signal VBIAS_1 from a port 75. The signal VBIAS_1 is generated by a voltage source 82 connected to the port 75. It is contemplated that the voltage source 82 can be included in the drive amplifier 6 or an external component configured to be connected to the drive amplifier 6. For instance, voltages sources are described in Paul Grey and Robert Meyer, "Analysis and Design of Analog Integrated Circuits", John Wiley & Son, pages 233–237, ISBN 0-471-87493-0.

The emitter of the transistor 73 is grounded via an inductor 74 and the collector is connected to the output 31 for the signal RF_OUT2. The transistor 73 is an npn bipolar junction transistor as discussed above. The inductor 74 has an inductance of about 4 nanohenries (nH) and the resistor 71 has a value of about 2 kiloohms. The inductor 74 may be an on-chip spiral inductor implemented in a metal layer of the chip, a parasitic inductance caused by the chip's packaging, an external inductor, or a combination thereof The signal VBIAS_1 is a DC voltage of about 0.8 volts which biases the transistor 73.

In one embodiment, the voltage source 82 comprises transistors Q1, Q2, resistors R10, R11 and a current source 69 which is connected to a supply voltage VCC. The base of the transistor Q1 is connected to the resistor R10 and the emitter is connected to ground. The collector of the transistor Q1 is connected to the current source 69 and to the base of the transistor Q2. The emitter of the transistor Q2 is connected to the resistor R10, to the port 75 and to the resistor R11 which is grounded. The collector of the transistor Q2 is connected to the supply voltage VCC.

The current source 69 is adapted to the drive amplifier 6. That is, the transistor 73 has a size which is about twenty times larger than the size of the transistor Q1, and the resistor R10 has a value which is about twenty times the value of the resistor 71. The ration between the transistors Q1 and Q73, and the ratio between the resistors R10, R71, ensure that the collector current of the transistor 73 is about twenty times the current output from the current source 69.

In one embodiment, the current source 69 provides a constant current of about 0.5 mA and the resistor R10 has a value of about 20 kiloohms. That is, the collector current (the signal BIAS_IOUT) of the transistor 73 is about 10 mA.

The drive amplifier 6 receives the signal RF_IN2 and outputs the signal RF_OUT2. The drive amplifier 6 has a transconductance of about 40 millisiemens at the frequency of the signal RF_IN2 (e.g., 900 MHz). The inductor 74 serves to linearize the drive amplifier 6. In an embodiment of the drive amplifier 6, the inductor 74 is a combination of a bond wire and a package pin having a total inductance of about 4 nH at 900 MHz. The bond wire connects the emitter of the transistor 73 to the (external) pin of the package. This pin is then connected to ground. As discussed above, the connection of the emitter to the external pin can also be via lines and internal or external inductors. To achieve a higher inductance and, thus, a higher linearity an external inductor may be connected to the external pin.

FIG. 4 is a schematic illustration of the LNA amplifier 4 shown in FIG. 1C. In the illustrated embodiment, the LNA amplifier 4 comprises a transistor 88, a resistor 86 and several inductors 91, 92, 96, 98 and capacitors 100, 102. The base of the transistor 88 is connected to the resistor 86 and to the input 24 which receives the signal RF_IN1. The resistor 86 is further connected to a port 84 which receives a bias signal VBIAS. The collector of the transistor 88 is connected to the output 28 for the signal RF_OUT1, and to the inductor 91 which is connected to the power supply VCC. The emitter of the transistor 88 is connected to the inductor 92 which is serially connected to the grounded capacitor 102. The emitter is further connected to the inductor 96 which is connected to the output 15 for the signal BIAS_1OUT, and to serial arrangement of the capacitor 100 and the inductor 98 which is grounded.

The signal VBIAS is a DC voltage of about 1.8 volts which biases the transistor 88. A DC path exists from the power supply VCC to the output 15 via the transistor 88 and the inductors 91, 96. As shown in FIG. 1C, the output 15 is connected to the winding 36 of the transformer 34 allowing the reuse of the DC current from the LNA amplifier 4 in the drive amplifier 6. This reuse of the DC current allows to save power consumed by the LNA amplifier 4 and mixer core 17. The serial inductor/capacitor arrangement 92, 102 and the serial inductor/capacitor arrangement 100, 98 provide for a good connection to ground for AC signals. The inductor 96 blocks RF signals from leaking from the transistor 88 to the transformer 34 and to the mixer core 17, and from leaking from the transformer 34 and the mixer core 17 to the transistor 88.

In one embodiment of the LNA amplifier 4, the resistor 86 has a value of about 1 kiloohm and the capacitors 100, 102 have values of about 33 picofarads (pF). The capacitor 100 is integrated on the chip, whereas the capacitor 102 is not integrated on the chip. The inductor 92 is a combination of a bond wire and a package pin having a total inductance of about 4 nH at 900 MHz. As discussed above, the bond wire connects the emitter of the transistor 88 to the pin of the package to which the external capacitor 102 is connected. Alternatively, the emitter can be connected to the pin via a line in combination with an internal or external inductor as discussed above. The inductor 96 is integrated on the chip and has an inductance of about 12 nH at 900 MHz. The inductor 98 is a bond wire having an inductance of about 0.5 nH at 900 MHz. It is contemplated that each one of the inductors 91, 92, 96, 98 can be implemented by a serial arrangement of two or more individual inductors to achieve specific desired values and/or to fulfill specific RF design rules. For instance, the integrated inductor 96 can be implemented by a serial arrangement of two inductors of about 11 nH and 1 nH. As the transistors T1–T4, 73, the transistor 88 is an npn bipolar junction transistor as discussed above.

FIG. 5 is a schematic illustration of a second embodiment of a mixer core 17' as used in an RF receiver, for example, within a cellular phone. The mixer core 17' has a structure that is similar to the structure of the mixer core 17 shown in FIG. 2. Thus, same components have the same reference numerals. Unlike the mixer core 17 which outputs a differential intermediate signal IF+, IF−, the mixer core 17' is configured to output a single-ended intermediate signal IF at an output 116. The transistors T1–T4, the resistors R1, R3, R4 are arranged as described in connection with FIG. 2 and similarly connected to the inputs 42, 44 and the ports 60, 62 which receive the signals RF+, RF−, LO+, LO−, respectively. The mixer core 17' also comprises a bias circuit 106 having a port 110 which is connected to the resistors R3, R4, and a port 104 connected to the power supply VCC. In this embodiment, the resistors R1, R3, R4 have values of about 1 kiloohm each.

The following description refers to the FIGS. 1C–4. The LNA amplifier 4 and the drive amplifier 6 form two common-emitter (CE) gain stages which share the same bias current (BIAS_IOUT). That is, the emitter is always operated at ground potential with respect to the signal. A CE gain stage is characterized by a moderately high input impedance and a high output impedance, where the input impedance is the impedance seen from the input terminals (base, emitter) and the output impedance is the impedance seen from the output terminals (collector, emitter).

The LNA amplifier 4 and the drive amplifier 6 are configured so that when the signal VBIAS is about 1.8 volts, the voltage across the collector-emitter of the transistor 88 is higher than the voltage across the collector-emitter of the transistor 73. In one embodiment, with a supply voltage of about 5 volts, the voltage across the transistor 88 is about 4 volts and the voltage across the transistor 73 is about 1 volt. In this embodiment, the DC bias current is about 10 mA. The higher voltage across the collector-emitter of the transistor 88 allows to fulfill the requirements of a high IP3 and a low noise figure.

The drive amplifier 6 is a gain stage for the mixer core 17. Because the collector of the transistor 73 "sees" a low impedance of the mixer core 17 via the transformer 34, the drive amplifier 6 can achieve a high IP3 without a high voltage across the collector-emitter path of the transistor 73. Further, because the RF signal input to the mixer is coupled in through the transformer 34, the mixer core 17 can be biased with an increased collector-emitter voltage for the transistors T1–T4. The increases collector-emitter voltage allows the mixer core 17 to achieve a higher gain by using a larger load resistor R1, R2. Thus, the mixer core 17 achieves a higher voltage swing while maintaining the linearity for a given bias current.

Coupling the drive amplifier 6 to the mixer core 17 via the transformer 34 provides for several additional advantages: A conversion from a single-ended signal (RF_OUT2) to a differential signal RF+, RF− suppresses even order distortion. The use of a single-ended gain stage (drive amplifier 6) helps in achieving a lower noise figure.

In one embodiment, the circuitry of the drive amplifier 6 is coupled to the mixer core 17 via the transformer 34 and provides for a gain of about 14 dB, a noise figure of less than 8 dB and an IP3 of more than +5 dBm for the mixer core 17.

Another advantage of the circuitry is that the power consumption is low due to the reuse of the DC current in the drive amplifier 6 and the LNA amplifier 4. A low power consumption is highly desired in cellular phones because the lower the power consumption, the longer the phone's battery lasts. This means that a smaller battery can be used allowing manufacturers to develop smaller cellular phones which also feature an extended stand-by operation and talk time.

As shown in FIG. 1C, the transformer 34 feeds the DC current from the LNA amplifier 4 to the drive amplifier 6. This reuse of the DC current allows to save power consumed by the LNA amplifier 4 and mixer core 17 which is a particular advantage of the embodiment of the present circuitry as discussed above.

Furthermore, it is of a particular advantage that the circuitry has an "IF trap" for the IF frequency. The resonant circuit formed by the inductor 41 and the capacitor 43 allows the DC current to flow through the inductor 41 without disturbing the DC biasing. At the IF frequency, the IF trap implements an "open" circuit. That is, the impedance at and near the resonant frequency for current flowing out of the terminal 40 of the transformer 34 is high. This high impedance lowers the gain at the IF frequency of a parasitic gain path that allows inherent thermal noise from the biasing circuits to reach the output 116 (FIG. 5). Reducing the amount of thermal noise that reaches the output reduces the noise figure of the circuit.

As described above, in one embodiment of the RF receiver 1, the transformer 34 feeds the DC current from the LNA amplifier 4 to the drive amplifier 6. As shown in FIG. 1C, the LNA amplifier 4, the drive amplifier 6 and the transformer 34, which forms an input stage of the mixer 2, are coupled together through the shared current (signal BIAS_1OUT). Thus, in one embodiment, the LNA amplifier 4, the drive amplifier 6, the transformer 34 and the mixer core 17 are integrated together.

In other embodiments, however, it may be preferable to design the mixer 2 so that it is decoupled from the amplifier 12. For instance, in the embodiment shown in FIG. 1B, the components of the receiver 1 are illustrated as separate and serially arranged components. The mixer 2 and the amplifier 12 are decoupled by the filter 14.

Figure 6A:
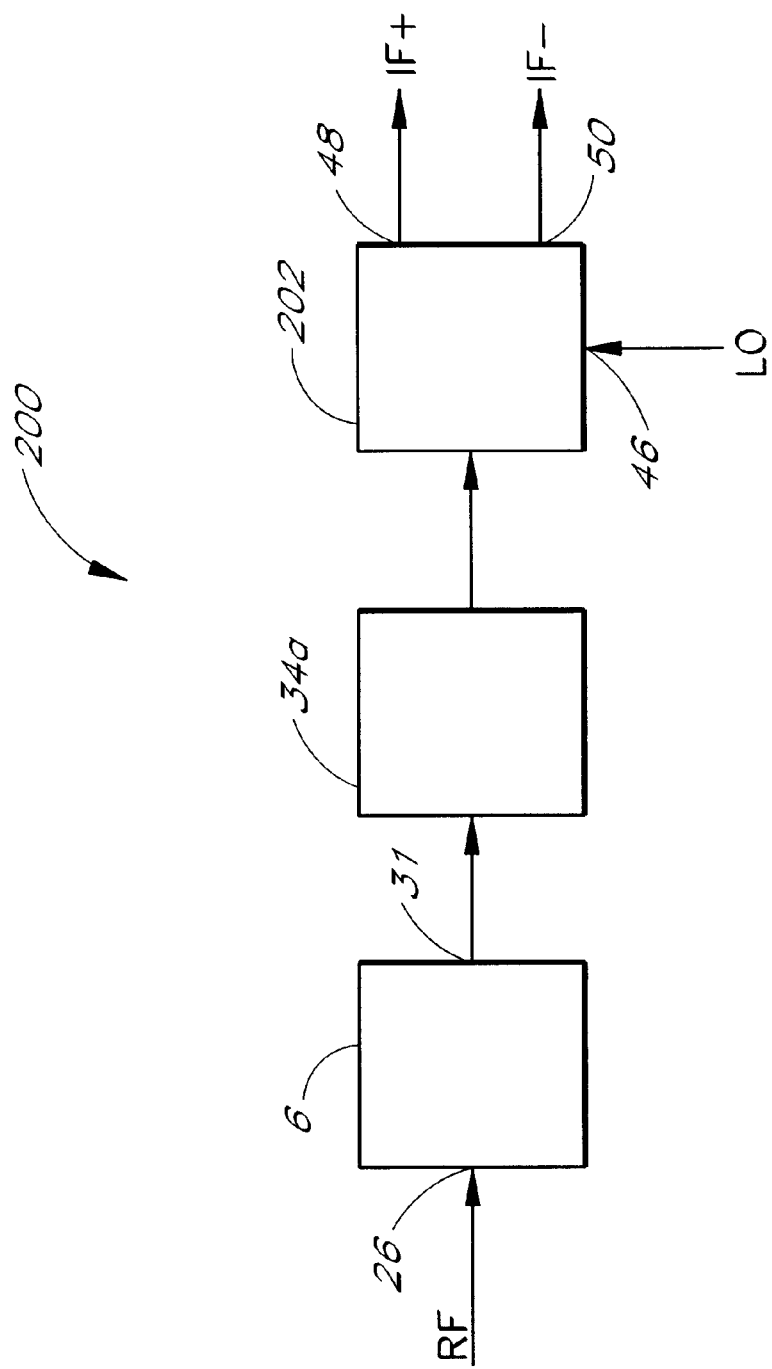
FIG. 6A is a block diagram of a mixer.

FIG. 6A is a block diagram of another embodiment of a mixer 200 that receives an RF signal, for example, from the amplifier 12 shown in FIG. 1B. The mixer 200 includes an input module which receives the RF signal and corresponds to the drive amplifier 6. The input module 6, thus, has the same reference numeral. The mixer 200 includes further a mixer module 202 and a transformer module 34a connected between the input module 6 and the mixer module 202. The mixer module 202 has an input 46 for the oscillator signal LO and outputs 48, 50 for the signals IF+, IF−, respectively.

The mixer 200 is generally interposed between the amplifier 12 and the signal processing module 22, as shown in FIG. 1B, and decoupled from the amplifier 12. Because of this decoupling, the mixer 200 can be designed and optimized independently from the amplifier 12. In addition, the mixer 200 utilizes a low noise RF mixer module 202 which can distinguish weak signals from noise and the sensitivity level of the RF receiver 1 is increased. In one embodiment, the mixer 200 and the RF receiver 1 are part of a wireless communications device such as a cellular phone.

In an exemplary cellular phone system, the cellular phone can be configured to receive an RF signal having a carrier frequency of about 800 MHz or about 900 MHz. The RF signal originates from a remote radio transmitter which modulates, for example, a 900 MHz signal with a data and/or voice signal. The mixer module 202 mixes the RF signal with an oscillator signal LO having a frequency between 930 MHz and 1200 MHz or between 500 MHz and 750 MHz. In one embodiment, the oscillator signal LO has a frequency of about 1 GHz. The mixer module 202 outputs a signal which has a desired intermediate frequency in the range of about 50 MHz to 300 MHz (difference between the frequency of the signal LO and the carrier frequency of the RF signal). Other cellular phone systems operate, for example, at carrier frequencies of about 1800 MHz or 1900 MHz. The frequency of the signal LO in these cellular phone systems is then selected to generate a similar range for the intermediate frequency.

Figure 6B:
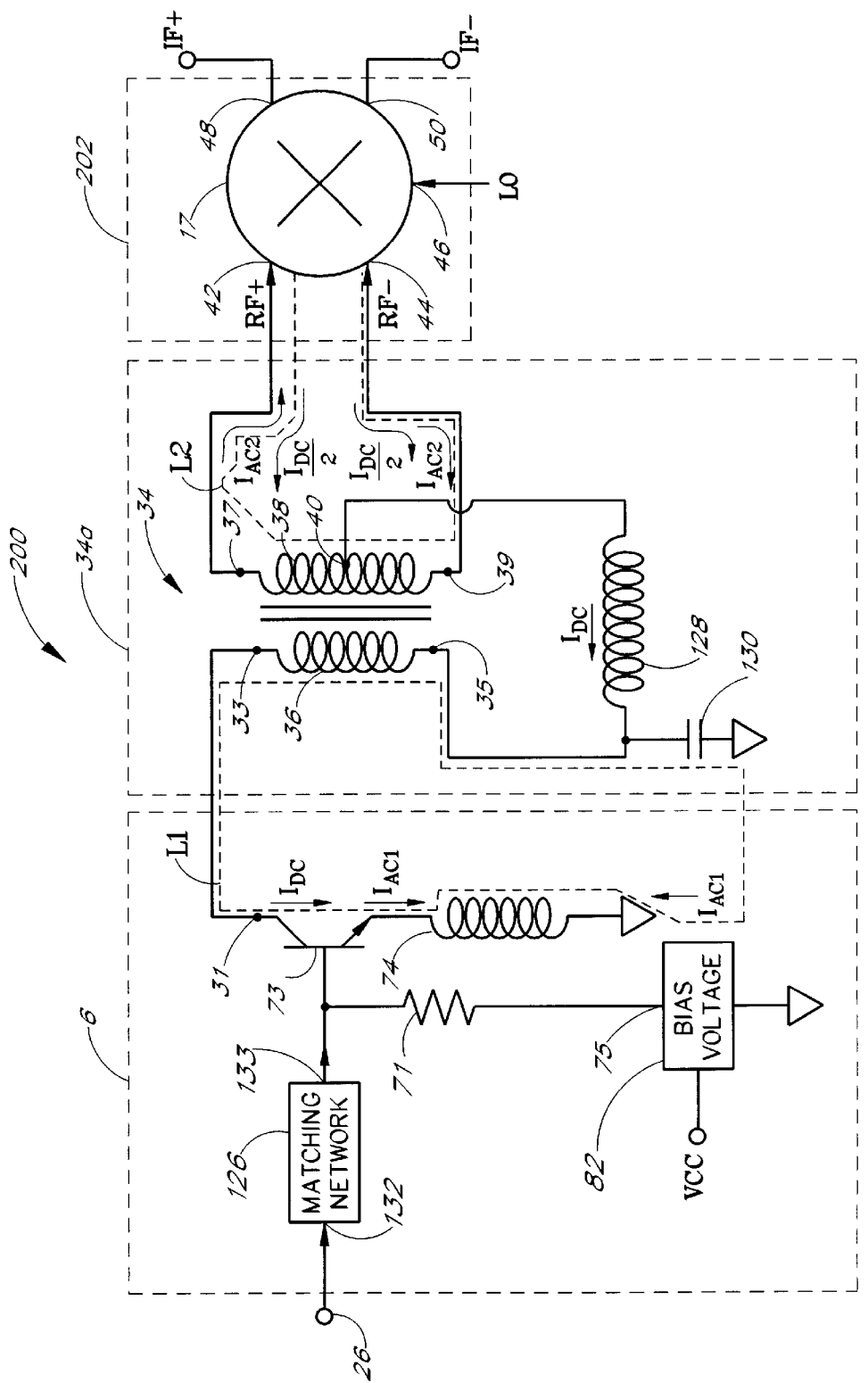
FIG. 6B is a schematic illustration of a of the mixer.

FIG. 6B is a schematic of one embodiment of the mixer 200. The input module 6, the transformer module 34a, and the mixer module 202 are indicated through dashed lines. The input module 6 has a structure that generally corresponds to the structure of the drive amplifier 6 shown in FIG. 3, and additionally includes a matching network 126. The matching network 126 has an input 132 connected to the input 26 of the input module 6. An output 133 of the matching network 126 is connected to the resistor 71 and the base of the transistor 73. The resistor 71 is further connected to the source 82 for a bias voltage. The source 82 is connected to the power supply (VCC). In one embodiment, the source 82 and the transistor 73 are implemented and connected as shown in FIG. 3.

The transformer module 34a includes the transformer 34 shown in FIG. 1C. The terminal 33 of the transformer 34 is connected to the collector of the transistor 73 whose emitter is connected to the grounded inductor 74. The terminals 37, 39 of the transformer 34 are connected to the inputs 42, 44, respectively, of the mixer module 202, which has the outputs 48, 50 for the differential signal formed by the signals IF+ and IF−. The signals IF+ and IF− are input to the filter 20 shown in FIG. 1B. In one embodiment, the transformer 34 has a transformation ratio of about 1:1. The tap 40 and the terminal 35 of the transformer 34 are connected through an inductor 128. In addition, the terminal 35 is connected to a grounded capacitor 130.

The mixer module 202 includes the mixer core 17 and peripheral circuitry (not shown). The mixer core 17 and the peripheral circuitry are shown in greater detail in FIG. 7.

In operation, the bias source 82 drives the transistor 73 through the resistor 71 as a function of a reference current so that a desired DC bias current $I_{DC}$ flows through the transistor 73, the transformer 34 and the mixer core 17. In the illustrated embodiment, the bias current $I_{DC}$ is shown as flowing from the mixer core 17 through the windings 38, 36 of the transformer 34, the inductors 74, 128, and through the transistor 73 to ground.

As the mixer core 17 is implemented in the differential embodiment, about half ($I_{DC}/2$) of the bias current $I_{DC}$ passes through the input 42 of the mixer core 17, and about half ($I_{DC}/2$) of the bias current $I_{DC}$ passes through the input 44. At the transformer tap 40, the currents ($I_{DC}/2$) combine and the complete bias current $I_{DC}$ flows through the inductor 128, the winding 36, the transistor 73 and the inductor 74. This structure of the mixer 200 allows to use the bias current $I_{DC}$ in both the mixer core 17 and the input module 6. That is, the bias current $I_{DC}$ generated in the input module 6 is reused in the mixer core 17.

With the input module 6 appropriately biased, the matching network 126 receives the RF signal, for example, from the filter 14 shown in FIG. 1B. The matching network 126 is a conventional network that matches the impedance of the input of the mixer 200 and the impedance of the output of the filter 14 so that, for example, undesired reflections are minimized. In one embodiment, the RF signal "sees" an impedance of about 50 ohms. The resistor 71 is selected to minimize any unwanted RF signal input to the bias source 82, and thus to maximize RF signal input to the transistor 73.

The RF signal generates an AC current $I_{AC1}$ in the transistor 73 which then flows through a first loop L1. The first loop L1 includes the grounded capacitor 130, the (primary) winding 36, the collector-emitter path of the transistor 73 and the inductor 74. The inductor 74 and the capacitor 130 are both connected to ground so that the first loop L1 is closed through ground. The capacitor 130 is designed to provide a path to ground for AC signals at radio frequencies. The transformer 34 transforms the AC current $I_{AC1}$ into an AC current $I_{AC2}$ flowing through a second loop L2. The second loop L2 includes the (secondary) winding 38 and the mixer core 17. The inductor 128 provides a current path for the bias current $I_{DC}$, and an isolation between the AC current $I_{AC1}$ flowing in the winding 36 of the transformer 34 and the AC current $I_{AC2}$ flowing in the winding 38 of the transformer 34.

The transistor 73 implements a common-emitter input stage feeding the primary winding 36 of the transformer 34. An advantage of the common-emitter stage is that it has a lower noise characteristic than a commonly used differential-pair input stage. As described above, the DC current $I_{DC}$ flowing through the common-emitter input stage is reused in the mixer core 17. Further, the illustrated embodiment of the mixer 200 converts a single-ended input signal to a differential signal (RF+, RF−) which is input to the mixer core 17.

Figure 7:
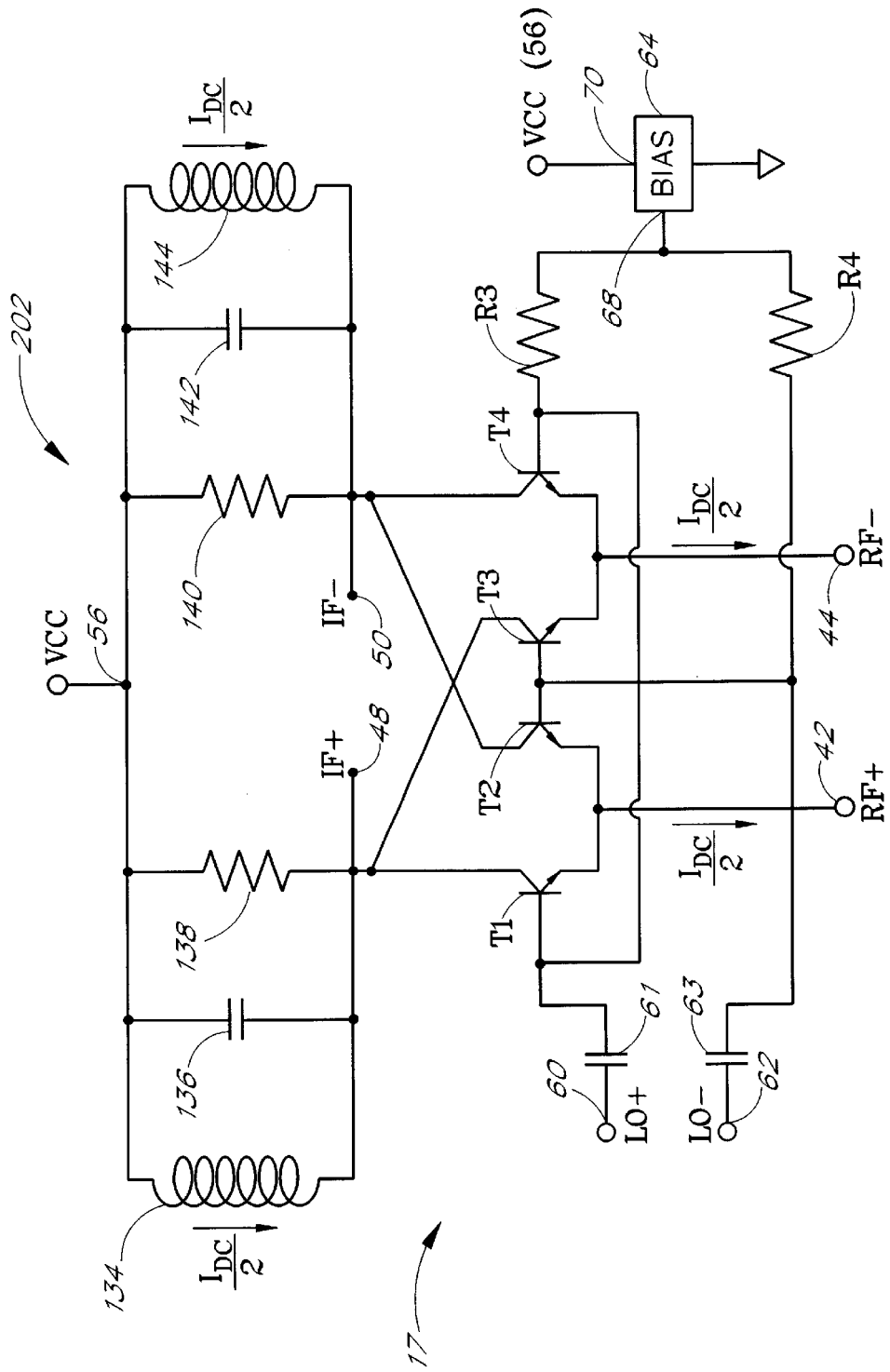
FIG. 7 is a schematic illustration of a mixer module.

FIG. 7 shows an embodiment of the mixer module 202 which includes the mixer core 17 and a peripheral circuit connected to the mixer core 17 and the power supply VCC. The peripheral circuit includes two resonance networks 134, 136, 138 and 140, 142, 144. FIG. 7 illustrates one embodiment of the mixer core 17, other embodiments of the mixer core 17 are shown in FIGS. 2, 5 and described above. The mixer core 17 of these embodiments includes a standard "Gilbert cell" which is commonly used for mixer cores. The embodiment shown in FIG. 2 is implemented as a differential output mixer core 17, and the embodiment shown in FIG. 5 is implemented as a single ended output mixer core 17'. The mixer core 17 of FIG. 7 is implemented as a differential output mixer core 17 as shown in FIG. 2. An advantage of the mixer module 202 is that it is configured to operate at a lower supply voltage VCC.

As shown in FIGS. 2, 5, 7, the mixer core 17 includes the transistors T1–T4 which form the center of the mixer core 17. The emitters of the transistors T1, T2 are interconnected and both connected to the input 42 for the signal portion RF+. The emitters of the transistors T3, T4 are interconnected and both connected to the input 44 for the signal portion RF−. The collectors of the transistors T1, T3 are interconnected and both connected to the output 48 for the signal IF+. The collectors of the transistors T2, T4 are interconnected and both connected to the output 50 for the signal IF−. The bases of the transistors T1, T4 are interconnected; both bases are connected to the port 60 which receives the "positive" signal LO+ derived from the local oscillator. The bases of the transistors T2, T3 are interconnected and both bases are connected to the port 62 which receives the "negative" signal LO− derived from the local oscillator. A capacitor 61 is interconnected between the port 60 and the transistors T1, T4, and a capacitor 63 is interconnected between the port 62 and the transistors T2, T3 and the resistor R4. The capacitors 61, 62 block any DC component of the signals LO+, LO− may have. The resistor R3 connects the transistors T1, T4 to the bias circuit 64, and the resistor R4 connects the transistors T2, T4 to the bias circuit 64.

The resonance circuits include parallel arrangements of inductors 134, 144, capacitors 136, 142, and resistors 138, 140. The inductors 134, 144 provide a DC current path between the power supply VCC and the transistors T1–T4. Therefore, the bias current $I_{DC}$ does not flow through the resistors 138, 140 and, advantageously, does not causes a DC voltage drop. The DC voltage available for the mixer core 17 is thus approximately the supply voltage VCC improving the dynamic range (signal swing) of the mixer core 17. If a DC voltage drop would occur, the available DC voltage would be the supply voltage VCC minus the DC voltage drop. The fact that the available DC voltage is approximately the supply voltage VCC allows to operate the mixer module 202 at a lower supply voltage VCC. In addition, the improved dynamic range improves the linearity (IP3) of the mixer core 17.

The values of the capacitors 136, 142 and the inductors 134, 144 are selected so that the impedances of the capacitors 136, 142 cancel the impedances of the inductors 134, 144 at a resonance frequency $f_{res}$. The resonance frequency $f_{res}$ is defined as, $$fres = 1/(2\pi \cdot \sqrt{L \cdot C}).$$

At the resonance frequency $f_{res}$, the signal "sees" only the resistors 138, 140 which serve as a load.

The mixer core 17 is a double-balanced mixer which has both the signals RF+, RF− and the signals LO+, LO− applied to separate inputs 42, 44 and ports 60, 62 in push-pull fashion. The signals LO+, LO− control the on-off cycles of the transistors T1–T4. For instance, when the transistor T1 is on, the input 42 is connected to the output 48, and when the transistor T3 is on, the input 44 is connected to the output 48. Similar on-off cycles exist for the transistors T2, T4. The operation of the mixer core 17 is as described in connection with FIG. 2.

In the embodiment shown in FIG. 7, the resonance networks 134, 136, 138 and 140, 142, 144 are interconnected between the power supply VCC and the mixer core 17. In one embodiment, the resonance networks 134, 136, 138 and 140, 142, 144 are external components, resistors 138, 140, capacitors 136, 142, and inductors 134, 144, connected to the integrated circuit (chip) which includes the mixer core 17 and the transformer 34. Both resonance networks 134, 136, 138 and 140, 142, 144 have the same frequency-dependent impedance (Z). which is maximal at the predetermined resonance frequency $f_{res}$. The resonance frequency $f_{res}$ is equal to the intermediate frequency of the output signals IF+, IF−. Exemplary values for the resonance frequency $f_{res}$ include 85 MHz and 210 MHz which are common, for example, in CDMA and AMPS systems.

In each resonance network 134, 136, 138 and 140, 142, 144, the resistor (R) 138, 140 determines the value of the maximal impedance (Z) at the resonance frequency $f_{res}$, i.e., Z≈R at the resonance frequency $f_{res}$. At very low frequencies, for example, f≈0 Hz, the inductors 134, 144 have a very low impedance, ideally Z≈0 ohm. In this case, each inductor 134, 144 conducts the current $I_{DC}/2$. Correspondingly, at very high frequencies, the capacitors 136, 142 have a low impedance.

Each resonance network 134, 136, 138 and 140, 142, 144 establishes the output impedance of the mixer 200 as seen from the outputs 48, 50. The resonance networks 134, 136, 138 and 140, 142, 144 can be configured to have impedances that match the impedance of the filter 20 that follows. In another embodiment, a matching network can be used to match the filter's impedance and the impedances of the resonance networks 134, 136, 138 and 140, 142, 144. The differential signal, formed by the signals IF+, IF−, "sees" a load of matched impedance whereby, for example, undesired reflections back into the mixer core 17 are minimized.

The embodiment shown in FIG. 6B is implemented almost completely as an integrated circuit. In one embodiment, the mixer core 17, the transformer 34, the inductors 74, 128, the capacitor 130, the transistor 73, and the resistor 71 are integrated on a semiconductor substrate (chip) such as silicon, GaAs, or other semiconductor materials typically used to manufacture integrated circuits. In addition, the bias source 82 (FIG. 6B) and the bias circuit 64 (FIG. 7) are integrated on the chip. The inductors 134, 144 and the capacitors 136, 142 are not integrated on the chip due to size constraints of a semiconductor chip. The matching network 126 and the local oscillator that generates the signals LO+ and LO− are external ("off-chip") components. It is contemplated that most of the components of the mixer 200 can be implemented "on-chip" or "off-chip," with various combinations thereof.

The embodiments shown in FIGS. 6B and 7 provide a low noise RF mixer 200 which is implemented, at least to a substantial degree, as an integrated circuit and which uses an on-chip transformer. Such a low noise mixer stage permits to receive and process signals having a low intensity. That is, the sensitivity level of the RF receiver 1 is increased.

Figure 8A:
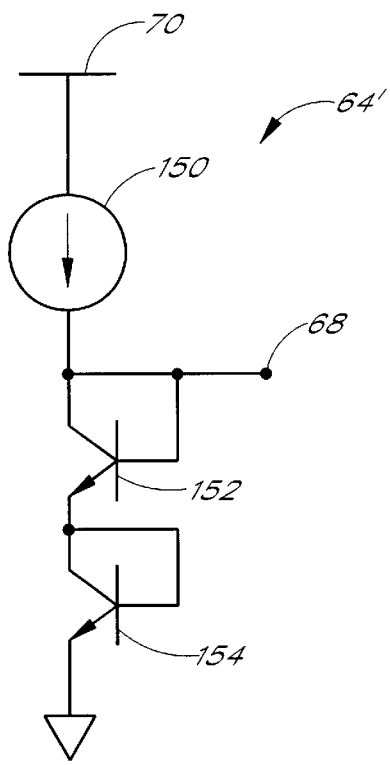
FIGS. 8A, 8B, 8C show embodiments of a bias circuit.
Figure 8B:
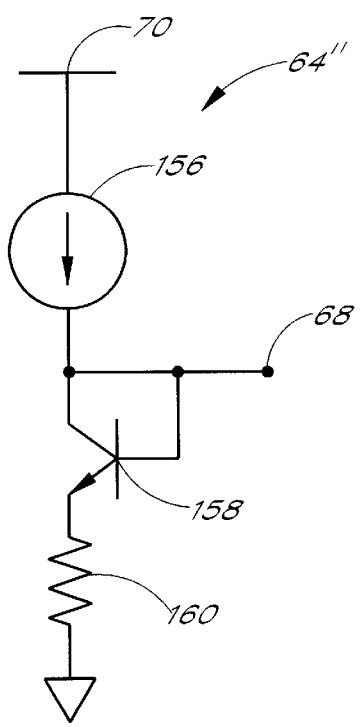
Figure 8C:
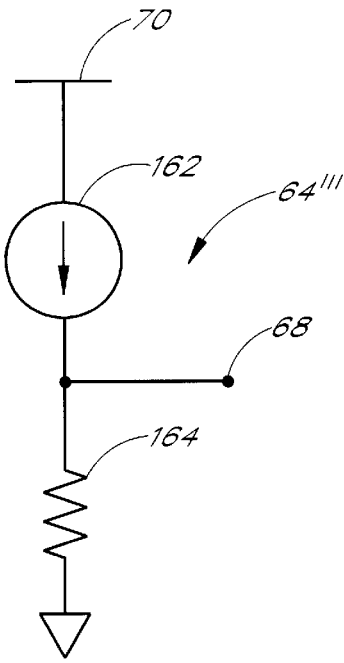

FIGS. 8A, 8B, 8C show various embodiments of the bias circuit 64 of FIG. 2 or 7. FIG. 8A shows an embodiment of a bias circuit 64' having the port 70 connected to the power supply VCC (56). A current source 150 and two npn transistors 152, 154 are connected in series between the port 70 and ground. The current source 150 is connected to the port 70 and the collector of the transistor 152. The collector is further connected to the base of the transistor 152 and the port 68. The emitter of the transistor 152 is connected to the emitter and the base of the transistor 154. With the base and collector interconnected, each transistor 152, 154 operates as a diode.

The potential at the collector of the transistor 152 is higher than the potential at its emitter, and, similarly, the potential at the collector of the transistor 154 is higher than the potential (i.e., ground) at its emitter. When the bias circuit 64' is active, the current source 150 generates a DC current that flows through the transistors 152, 154 causing a voltage drop of about 0.8 volts at each transistor 152, 154. The voltage output at the port 68, with respect to ground, is thus about 1.6 volts.

FIG. 8B shows an embodiment of a bias circuit 64" having the port 70 connected to the power supply VCC (56). A current source 156, an npn transistor 158, and a resistor 160 are connected in series between the port 70 and ground. The current source 156 is connected to the port 70 and the collector of the transistor 158. The collector is further connected to the base of the transistor 158 and the port 68. The emitter of the transistor 158 is connected to a first terminal of the resistor 160 which has a second terminal connected to ground. With the base and collector interconnected, the transistor 158 operates as a diode.

Similar to the embodiment of FIG. 8A, the current source 156 generates a DC current that flows through the transistor 158 and the resistor 160. A voltage drop a the resistor 160 is added to the voltage drop at the transistor 158 and, with respect to ground, the sum of the voltage drops is available at the port 68.

FIG. 8C shows an embodiment of a bias circuit 64''' having the port 70 connected to the power supply VCC (56). A current source 162 and a resistor 164 are connected in series between the port 70 and ground. The current source 150 is connected to the port 70, the port 68, and a first terminal of the resistor 164 which has a second terminal connected to ground.

When the bias circuit 64''' is active, the current source 1562 generates a DC current that flows through the resistor 164. The voltage drop at the resistor 164 is available at the port 68.

While the above detailed description has shown, described and identified several novel features of the invention as applied to a preferred embodiment, it will be understood that various omissions, substitutions and changes in the form and details of the described embodiments may be made by those skilled in the art without departing from the spirit of the invention. Accordingly, the scope of the invention should not be limited to the foregoing discussion, but should be defined by the appended claims.

What is claimed is:

1. A hand-held communications device, comprising:
    a mixer core, the mixer core configured to receive a first signal having a first frequency and a second signal having a second frequency, and to output a third signal which is a function of the first and second signals;
    an input circuit configured to set a predetermined bias current and to receive a radio frequency (RF) signal; and
    an interface circuit, the interface circuit interposed between the mixer core and the input circuit, the interface circuit comprising a first conductive path configured to convey the bias current between the input circuit and the mixer core, the interface circuit further comprising a second conductive path configured to convert the RF signal into the first signal, wherein the first conductive path comprises an inductor that isolates the bias current from the RF signal, wherein the first and second conductive paths are further configured to combine the first signal and the bias current.

2. The hand-held device of claim 1, wherein the interface circuit comprises a transformer having a first and a second winding, the first winding connected to the input circuit and the second winding connected to the mixer core.

3. The hand-held device of claim 2, wherein the input circuit comprises a transistor connected to the first winding of the transformer and configured to receive the RF signal.

4. The hand-held device of claim 3, wherein the transistor and the transformer are connected so that the bias current flows through the transistor, the first and second windings, and the mixer core.

5. The hand-held device of claim 2, wherein the input circuit is configured to convert the RF signal into a first alternating signal, and wherein the transformer converts the first alternating signal into a second alternating signal which is the first signal input to the mixer core.

6. The hand-held device of claim 2, wherein the first conductive path connects the first winding and the second winding.

7. The hand-held device of claim 6, wherein the first conductive path comprises a serial inductor and a grounded capacitor.

8. The hand-held device of claim 7, wherein the grounded capacitor, the first winding and the transistor form a first loop conducting the first alternating signal.

9. The hand-held device of claim 1, further comprising a filter circuit and an amplifier module, the filter circuit interconnected between the input circuit and the amplifier module.

10. The hand-held device of claim 9, wherein the amplifier module is configured to operate at a frequency of approximately 800 MHz.

11. The hand-held device of claim 9, wherein the amplifier module is configured to operate at a frequency of approximately 900 MHz.

12. The hand-held device of claim 9, wherein the amplifier module is configured to operate at a frequency of approximately 1800 MHz.

13. The hand-held device of claim 9, wherein the amplifier module is configured to operate at a frequency of approximately 1900 MHz.

14. The hand-held device of claim 1, wherein the second signal is generated by a local oscillator.

15. The hand-held device of claim 1, wherein the mixer core, the input circuit and the interface circuit are integrated on a semiconductor substrate comprising silicon.

16. The hand-held device of claim 9, wherein the filter circuit is configured to implement a band pass filter.

17. The hand-held device of claim 1, wherein the hand-held communications device is a cellular phone.

18. The hand-held device of claim 1, wherein the hand-held communications device is a wireless phone.

19. An apparatus for generating an intermediate signal, comprising:
    a mixer core, the mixer core configured to receive a first signal having a first frequency and a second signal having a second frequency, and to output a third signal which is a function of the first and second signals;
    a circuit configured to define a predetermined electrical signal which sets the mixer core at a predetermined operational point, and to receive an input signal; and
    an interface circuit, the interface circuit interposed between the mixer core and the circuit, the interface circuit comprising a first conductive path configured to convey the electrical signal between the circuit and the mixer core, the interface circuit further comprising a second conductive path configured to convert the input signal into the first signal, wherein the first conductive path comprises an inductor that isolates the electrical signal from the input signal, wherein the first and second conductive paths are further configured to combines the first signal and the electrical signal.

20. The apparatus of claim 19, wherein the predetermined electrical signal is a bias current.

21. The apparatus of claim 20, wherein the interface circuit is a transformer having a first and a second winding, the first winding connected to the circuit and the second winding connected to the mixer core.

22. The apparatus of claim 21, wherein the circuit comprises a transistor connected to the first winding of the transformer and configured to receive the input signal.

23. The apparatus of claim 22, wherein the transistor and the transformer are connected so that the bias current flows through the transistor, the first and second windings, and the mixer core.

24. The apparatus of claim 22, wherein the input signal is a radio frequency (RF) signal, wherein the circuit is configured to convert the RF signal into a first alternating signal, and wherein the transformer converts the first alternating signal into a second alternating signal which is the first signal input to the mixer core.

25. The apparatus of claim 22, further comprising a by-pass connecting the first winding and the second winding, the by-pass configured to conduct the bias current.

26. The apparatus of claim 25, wherein the by-pass comprises a serial inductor and a grounded capacitor.

27. The apparatus of claim 26, wherein the grounded capacitor, the first winding and the transistor forming a first loop conducting the first alternating signal.

28. The apparatus of claim 19, further comprising a filter circuit and an amplifier module, the filter circuit interconnected between the circuit and the amplifier module.

29. The apparatus of claim 28, wherein the amplifier module is configured to operate at a frequency selected from a group including 800 MHz, 900 MHz, 1800 MHz, and 1900 MHz.

30. The apparatus of claim 19, wherein the second signal is generated by a local oscillator.

31. The apparatus of claim 19, wherein the mixer core, the circuit and the interface circuit are integrated on a silicon substrate.

32. The apparatus of claim 19, wherein the mixer core is a double-balanced mixer core.

33. The apparatus of claim 21, wherein the transformer is a balanced transformer.

34. The apparatus of claim 19, wherein the mixer core outputs a differential signal as the third signal.

35. A method of generating an intermediate signal, comprising:

generating an electrical signal to set a predetermined operational point of a mixer core;

receiving a first signal having a first frequency, converting the first signal into a first alternating signal, and superimposing the first alternating signal and the electrical signal;

transforming the first alternating signal into a second alternating signal in a first conductive path;

isolating the electrical signal from the first alternating signal in a second conductive path;

superimposing the second alternating signal and the isolated electrical signal;

receiving a second signal having a second frequency; and mixing the second alternating signal and the second signal to generate a third signal which is a function of the first and second signals.

36. The method of claim 35, further comprising amplifying the first signal.

37. The method of claim 35, further comprising filtering the first signal.

38. The method of claim 35, wherein the act of transforming the first alternating signal includes generating the second alternating signal as a differential signal.

39. The method of claim 35, wherein the act of transforming the first alternating signal includes feeding the first alternating signal to a first winding of a transformer and outputting the second alternating signal from a second winding of the transformer.

40. The method of claim 35, further comprising:

conveying a first portion of the electrical signal through a first terminal of a second winding of a transformer, and conveying a second portion of the electrical signal through a second terminal of the second winding of the transformer;

combining the first and second portions of the electrical signal at a third terminal of the second winding;

conveying the electrical signal from the third terminal of the second winding to a first terminal of a first winding of the transformer and conveying the electrical signal through a second terminal of the first winding; and conveying the electrical signal to a collector terminal of a transistor.

41. The method of claim 40, further comprising feeding the electrical signal through an inductor connected between the third terminal of the second winding and the first terminal of the first winding.

42. A method of operating a communications device, comprising:

generating a predetermined bias current;

isolating the bias current from a radio frequency (RF) signal to convey the bias current between an input circuit and a mixer core in a first conductive path;

converting the RF signal into a first signal having a first frequency in a second conductive path;

combining the first signal and the isolated bias current;

mixing the first signal and a second signal having a second frequency to generate a third signal which is a function of the first and second signals.

43. The method of claim 42, wherein the predetermined bias current is a direct (DC) current.

44. The method of claim 42, wherein the act of converting the RF signal includes converting the RF signal to a first alternating signal.

45. The method of claim 44, wherein the act of converting the RF signal includes transforming the first alternating signal into the first signal.

46. An apparatus for generating an intermediate signal, comprising:

a mixer core, the mixer core configured to receive a first signal having a first frequency and a second signal having a second frequency, and to output a third signal which is a function of the first and second signals;

an input circuit configured to set a predetermined bias current and to receive a radio frequency (RF) signal; and a transformer having a first winding and a second winding, the transformer interposed between the mixer core and the input circuit and configured to separate the bias current from the RF signal, to convey the bias current via a first conductive path between the input circuit and the mixer core that isolates the bias from the RF signal, the input circuit further configured to convert the RF signal into the first signal, and to combine the first signal and the isolated bias current.

47. The apparatus of claim 46, wherein the first winding is connected to the input circuit and the second winding is connected to the mixer core.

48. The apparatus of claim 47, wherein the first and second windings are coupled via the first conductive path to conduct the bias current.

49. The apparatus of claim 47, wherein the first conductive path includes an inductor and a capacitor connected to ground.

50. An apparatus for generating an intermediate signal, comprising:

a mixer core, the mixer core configured to receive a first signal having a first frequency and a second signal having a second frequency, and to output a third signal which is a function of the first and second signals;

an input transistor configured to set a predetermined bias current and to receive a radio frequency (RF) signal; and a transformer having a first winding and a second winding, the transformer interposed between the mixer core and the input transistor and configured to convey the bias current through an inductor between the input transistor and the mixer core to isolate the bias current and to convert the RF signal into the first signal, wherein the transformer is configured to separate the bias current from the RF signal and to combine the first signal and the isolated bias current.

51. The apparatus of claim 50, further comprising a matching network connected to a base of the input transistor, the matching network configured to input the RF signal to the input transistor.

52. The apparatus of claim 50, further comprising a bias source connected to a base of the input transistor, the bias source configured to operate the input transistor so that the predetermined bias current is set.

53. A method of generating an intermediate signal, comprising:

generating an electrical signal to set a predetermined operational point of a mixer core;

receiving a first signal having a first frequency, converting the first signal into a first alternating signal, and superimposing the first alternating signal and the electrical signal;

transforming the first alternating signal into a second alternating signal separating the electrical signal from the first alternating signal;

superimposing the second alternating signal and the electrical signal;

receiving a second signal having a second frequency;

mixing the second alternating signal and the second signal to generate a third signal which is a function of the first and second signals;

conveying a first portion of the electrical signal through a first terminal of a second winding of a transformer, and conveying a second portion of the electrical signal through a second terminal of the second winding of the transformer;

combining the first and second portions of the electrical signal at a third terminal of the second winding;

conveying the electrical signal from the third terminal of the second winding to a first terminal of a first winding of the transformer and conveying the electrical signal through a second terminal of the first winding; and conveying the electrical signal to a collector terminal of a transistor.

54. The method of claim 53, further comprising feeding the electrical signal through an inductor connected between the third terminal of the second winding and the first terminal of the first winding.

\* \* \* \* \*

UNITED STATES PATENT AND TRADEMARK OFFICE
CERTIFICATE OF CORRECTION

PATENT NO. : 6,850,746 B1 Page 1 of 1
APPLICATION NO. : 09/371311
DATED : February 1, 2005
INVENTOR(S) : Lloyd et al.

It is certified that error appears in the above-identified patent and that said Letters Patent is hereby corrected as shown below:

IN THE DRAWING
Sheet 5 of 11  Fig.3         Delete "Vcc" and insert -- VCC --, therefore.

Column 3    Line 65          After "of a" delete "of the".

Column 6    Line 57          Delete "BIAS-1OUT" and insert -- BIAS_IOUT, --, therefor.

Column 10   Line 24          Delete "BIAS-1OUT" and insert -- BIAS_IOUT, --, therefor.

Column 12   Line 22          Delete "BIAS-1OUT" and insert -- BIAS_IOUT, --, therefor.

Column 15   Line 14 (Approx.)   Delete "$f$res" and insert $f_{res}$ --, therefor.

Column 15   Line 37          Delete "(Z)." and insert -- (Z) --, therefor.

Column 18   Line 30-31       In Claim 19, delete "combines" and insert -- combine --, therefor.

Column 18   Line 57          In Claim 27, delete "forming" and insert -- form --, therefor.

Signed and Sealed this

First Day of August, 2006

JON W. DUDAS
*Director of the United States Patent and Trademark Office*